(12) United States Patent
Smyrniotis et al.

(10) Patent No.: US 9,289,721 B2
(45) Date of Patent: Mar. 22, 2016

(54) PROCESS AND APPARATUS FOR IMPROVING THE OPERATION OF WET SCRUBBERS

(71) Applicants: Christopher R. Smyrniotis, St. Charles, IL (US); Kent W. Schulz, Geneva, IL (US); Emelito P. Rivera, Inverness, IL (US); Ian Saratovsky, Highland Park, IL (US); Vasudeo S. Gavaskar, Naperville, IL (US)

(72) Inventors: Christopher R. Smyrniotis, St. Charles, IL (US); Kent W. Schulz, Geneva, IL (US); Emelito P. Rivera, Inverness, IL (US); Ian Saratovsky, Highland Park, IL (US); Vasudeo S. Gavaskar, Naperville, IL (US)

(73) Assignee: FUEL TECH, INC., Warrenville, IL (US)

( * ) Notice: Subject to any disclaimer, the term of this patent is extended or adjusted under 35 U.S.C. 154(b) by 99 days.

(21) Appl. No.: 14/190,900

(22) Filed: Feb. 26, 2014

(65) Prior Publication Data

US 2014/0241970 A1  Aug. 28, 2014

Related U.S. Application Data

(60) Provisional application No. 61/769,819, filed on Feb. 27, 2013, provisional application No. 61/827,296, filed on May 24, 2013, provisional application No. 61/914,592, filed on Dec. 11, 2013.

(51) Int. Cl.
*B01D 53/50* (2006.01)
*B01D 53/68* (2006.01)
(Continued)

(52) U.S. Cl.
CPC .............. *B01D 53/68* (2013.01); *B01D 53/502* (2013.01); *B01D 53/75* (2013.01); *B01D 53/78* (2013.01); *F23J 15/04* (2013.01); *B01D 2251/404* (2013.01);
(Continued)

(58) Field of Classification Search
CPC ...... B01D 53/50; B01D 53/508; B01D 53/68; B01D 53/685; B01D 53/74
See application file for complete search history.

(56) References Cited

U.S. PATENT DOCUMENTS 2,965,438 A  12/1960  Mullen, Jr.
3,226,192 A  12/1965  Atsukawa et al.
(Continued)

FOREIGN PATENT DOCUMENTS

WO  9219365 A1  11/1992
WO  9533547 A1  12/1995
(Continued)

OTHER PUBLICATIONS

Shaw, William A., Power Magazine, pp. 56-62, 2011.
(Continued)

*Primary Examiner* — Timothy Vanoy
(74) *Attorney, Agent, or Firm* — Thaddius J. Carvis

(57) ABSTRACT

The operation of wet scrubbers, especially those based on calcium carbonate, is improved by reducing the quantities of soluble chlorides in the combustion gases fed to the scrubbers. HCl in the combustion gases is converted to a solid copper chloride and removed before the chloride reaches the scrubber. Combustion gases are treated with an aqueous copper compound referred to as copper-bearing chloride remediator (CBCR). Effective temperatures for introducing the CBCRs are preferably within the range of from about 250° to 900° F. Among the more preferred CBCRs are copper compositions including copper, an organic moiety and/or an ammonia moiety.

15 Claims, 3 Drawing Sheets

(51) Int. Cl.
  *B01D 53/74* (2006.01)
  *B01D 53/75* (2006.01)
  *B01D 53/78* (2006.01)
  *F23J 15/04* (2006.01)

(52) U.S. Cl.
  CPC .. *B01D 2251/60* (2013.01); *B01D 2255/20761* (2013.01); *B01D 2257/2045* (2013.01); *B01D 2257/302* (2013.01); *B01D2258/0283* (2013.01); *F23J 2219/10* (2013.01); *F23J 2219/20* (2013.01); *F23J 2219/40* (2013.01)

(56) References Cited

U.S. PATENT DOCUMENTS

| | | | |
|---|---|---|---|
| 3,900,504 A | | 8/1975 | Woerner |
| 3,956,458 A | | 5/1976 | Anderson |
| 4,020,180 A | | 4/1977 | Woerner |
| 4,081,253 A | | 3/1978 | Marion |
| 4,147,756 A | * | 4/1979 | Dahlstrom et al. ......... 423/243.1 |
| 4,157,380 A | * | 6/1979 | Prahl ............................ 423/488 |
| 4,500,327 A | | 2/1985 | Nishino et al. |
| 4,609,537 A | | 9/1986 | Tolpin et al. |
| 4,724,130 A | | 2/1988 | Statnick et al. |
| 4,731,233 A | | 3/1988 | Thompson et al. |
| 4,755,499 A | | 7/1988 | Neal et al. |
| 4,795,586 A | | 1/1989 | Thompson et al. |
| 4,923,688 A | | 5/1990 | Iannicelli |
| 5,114,898 A | | 5/1992 | Pinnavaia et al. |
| 5,492,685 A | | 2/1996 | Moran |
| 5,520,898 A | | 5/1996 | Pinnavaia et al. |
| 5,565,180 A | | 10/1996 | Spink |
| 5,635,149 A | | 6/1997 | Klingspor et al. |
| 5,658,547 A | | 8/1997 | Michalak et al. |
| 5,728,358 A | * | 3/1998 | Avidan et al. ............ 423/244.01 |
| 5,740,745 A | | 4/1998 | Smyrniotis et al. |
| 5,741,469 A | * | 4/1998 | Bhore et al. ............. 423/244.01 |
| 5,894,806 A | | 4/1999 | Smyrniotis et al. |
| 5,897,688 A | | 4/1999 | Voght et al. |
| 6,281,164 B1 | | 8/2001 | Demmel et al. |
| 6,453,830 B1 | | 9/2002 | Zauderer |
| 6,579,507 B2 | | 6/2003 | Pahlman et al. |
| 6,808,692 B2 | | 10/2004 | Oehr |
| 6,878,358 B2 | | 4/2005 | Vosteen et al. |
| 6,953,494 B2 | | 10/2005 | Nelson, Jr. |
| 6,974,564 B2 | | 12/2005 | Biermann et al. |
| 7,435,286 B2 | | 10/2008 | Olson et al. |
| 7,666,374 B2 | | 2/2010 | Grochowski |
| 2006/0210463 A1 | | 9/2006 | Comrie |
| 2008/0127631 A1 | | 6/2008 | Haitko |
| 2009/0056538 A1 | | 3/2009 | Srinivasachar |
| 2010/0059428 A1 | | 3/2010 | Boren |
| 2010/0282140 A1 | | 11/2010 | Matteson et al. |
| 2010/0317509 A1 | | 12/2010 | Wang |
| 2010/0320294 A1 | | 12/2010 | Neumann et al. |
| 2011/0045422 A1 | | 2/2011 | Tanca |
| 2011/0079143 A1 | | 4/2011 | Marotta |
| 2011/0123422 A1 | | 5/2011 | Wang |
| 2014/0314651 A1 | * | 10/2014 | Smyrniotis et al. ....... 423/240 R |

FOREIGN PATENT DOCUMENTS

WO    0216026 A1    2/2002
WO    2011143517 A1    11/2011

OTHER PUBLICATIONS

Henzel, D.S., Laseke, B.A., Smith E.O., Do. Swenson, Project Summary Limestone FGD Scrubbers: User's Handbook; 1981; EPA-600/S81-017.

EPA-452/R-97-101; Dec. 1997; Mercury Study, Report 5 to Congress Volume VII: An Evaluation of Mercury Control Technologies and Costs.

Kettner, The Removal of Sulfur Dioxide from Flue Gases. Bulletin of he World Health Organization. 31: 421-429, 1965. [retreived from the Internet., URL: http://whqlibodoc.who,int/bulletin/1965/Vol32-No3/bulletin__1965__32%283%29__421-429.pdf. entire document.

Srivastava, Ravi K., Controlling SO2 Emissions: A Review of Technologies: EPA/600R-00/0093, Nov. 2000.

* cited by examiner

PROCESS AND APPARATUS FOR IMPROVING THE OPERATION OF WET SCRUBBERS

CROSS REFERENCE TO RELATED APPLICATIONS

This application is related to copending U.S. patent application Ser. No. 13/854,361, filed Apr. 1, 2013, and Ser. No. 13/873,668, filed Apr. 30, 2013, and claims priority to U.S. Provisional Patent Applications No. 61/769,819, filed Feb. 27, 2013, U.S. Provisional Application No. 61/827,296, filed May 24, 2013, and U.S. Provisional Application No. 61/914,592, filed Dec. 11, 2013, the disclosures of all of which are hereby incorporated herein by reference in their entireties.

FIELD OF THE INVENTION

The invention relates to improving the operation of wet scrubbers for reducing sulfur oxides emissions from combustors by reducing chloride input into wet scrubbers. $SO_2$ scrubbers, particularly those based on calcium carbonate are enhanced in operation by reducing the quantities of soluble chlorides in the combustion gases that are flowing to them. By converting gaseous HCl in the combustion gases to a solid insoluble form recoverable by particulate removal apparatus and removing the particulates before the chloride reaches the scrubber, the reactivity of the scrubbing slurry can be better maintained and the frequency and/or amount of water discharge from the scrubber can be decreased. The invention minimizes liquid discharge by decreasing blow down frequency and limiting volume of waste water to be treated.

BACKGROUND OF THE INVENTION

The production of hydrogen chloride during combustion of some coals, petroleum fractions and various wastes has challenged combustion plant operators and regulators over many years. The chlorides produced can be effectively controlled by processes including wet scrubbing, however the presence of soluble chloride can have adverse effects on calcium carbonate based scrubbers.

When soluble chlorides reach a wet scrubber, such as a single-loop, open-tower countercurrent limestone wet scrubber, the reactivity of the scrubbing slurry will be adversely affected because chlorine in any form, such as chlorides, tend to be highly soluble and destroy the equilibrium within the scrubber by freeing some of the calcium from its primary function of capturing the $SO_2$ as $CaSO_3$. As pointed out in U.S. Pat. No. 5,635,149 to Klingspor, et al., to maintain reactor efficiency, the chloride content should be monitored and sorbent slurry removed as necessary and replaced with fresh sorbent. This is costly from the raw material standpoint and can decrease the quality of the gypsum produced by reducing the residence time in the reaction tank where oxygen is supplied to convert the $CaSO_3$ to gypsum, $CaSO_4$, which can provide needed revenue if of sufficient quality.

If it were possible to control the amount of chloride entering a wet scrubber designed for sulfur oxides removal, the operation of such scrubbers could be improved by reducing frequency of removing slurry based on chloride concentration exceeding a set limit. If the frequency were decreased, other factors, such as gypsum quality, gypsum particle size, the capture of other contaminants, and the like, could be used for process control. Control of the chloride concentration entering the scrubber could increase reaction tank residence times and decrease blow down from the tank.

The composition of wet scrubber wastewater effluent streams (e.g. blow down, filtrate from gypsum filtration, etc.) are primarily composed of chloride salts (e.g. calcium chloride) and other dissolved solids, usually in the range of 5,000 to 40,000 mg/L, see Shaw, William A., Power Magazine, Oct. 1, 2011, pages 56-62. Discharge of wastewaters is increasingly being regulated owing to the presence of trace toxic elements in the water, including arsenic, selenium, and boron. Increasingly, power plants are being held to zero liquid discharge limits. Options for zero liquid discharge include capital-intensive wastewater treatment systems followed by evaporation towers for the crystallization of inorganic salts. Evaporation towers can have large parasitic load requirements, on the order of 18-35 kWh/metric ton of water. Significant capital reductions can be achieved by removal of chlorides prior to entering the scrubber thereby minimizing the total volume and frequency of blow down, which is typically controlled by the chloride concentration in the wet scrubber liquor.

The prior art has dealt with the problem of halide build up in scrubber tanks, but is still awaiting an effective and economical solution. Additives to the tank are costly and affect other chemistries. Prescrubbers create large amounts of waste water that must be treated or disposed of. Post-scrubber treatment of blow down must be either treated to remove regulated contaminants (e.g. boron, arsenic, selenium), or water must be evaporated leaving a solid waste to be landfilled.

A low capital alternative to HCl reduction ahead of wet scrubbers is sorbent injection. Sorbent injection can be used to reduce the chloride concentration entering the scrubber; however, existing sorbents (e.g. trona, sodium bicarbonate, and hydrated lime) react with both $SO_2$ and HCl. Typically, flue gas $SO_2$ concentrations (e.g. 1500-3000 ppm$_v$) are several orders of magnitude greater than HCl concentrations (e.g. 1-200 ppm$_v$). Owing to poor selectivity for HCl, sorbent injection rates can often exceed practical and economic limits.

Accordingly, there is a present need for a process that can reduce the amount of chloride entering a wet scrubber.

SUMMARY OF THE INVENTION

The present invention provides processes, apparatus, compositions and systems that will have a very positive effect on air quality and water usage by enabling removal of HCl in a gas stream and, thereby affording other benefits as well.

This is achieved, in one aspect, by a process, which comprises: introducing a copper bearing chloride remediator (CBCR) composition in aqueous form into contact with combustion gases to react with the HCl in the gases to convert it to a solid, recoverable form; passing the gases to a particulate recovery device to collect solids including chloride; and feeding a resulting reduced chloride gas stream to a wet scrubber, thereby enabling the scrubber to operate more efficiently.

In another aspect, the invention provides an apparatus comprising: means for introducing a copper bearing chloride remediator (CBCR) composition in aqueous form into combustion gases; particulate recovery means for collecting solids in the gases; and means for feeding a resulting reduced chloride gas stream to a wet scrubber.

Other preferred aspects, including preferred conditions and equipment and their advantages, are set out in the description which follows.

BRIEF DESCRIPTION OF THE DRAWINGS

The invention will be better understood and its advantages will become more apparent when the following detailed description is read in conjunction with the accompanying drawings, in which.

DETAILED DESCRIPTION OF THE INVENTION

The present invention provides processes and apparatus that will have a very positive effect on air quality by enabling wet $SO_2$ scrubbers to operate more efficiently, and reduce the quantity of scrubber effluent wastewater to be treated. The efficiency is achieved by reducing the concentration of HCl in a gas stream from a combustor prior to passing the gas through a wet scrubber.

The ability to reduce the concentration of chloride entering a wet scrubber can be employed as a retrofit solution to existing scrubbers or in their initial design. It has been discovered that certain copper bearing chloride remediator (CBCR) compositions in aqueous form, when contacted with combustion gases can be effective for reducing HCl introduced into a wet scrubber.

Figure 1:
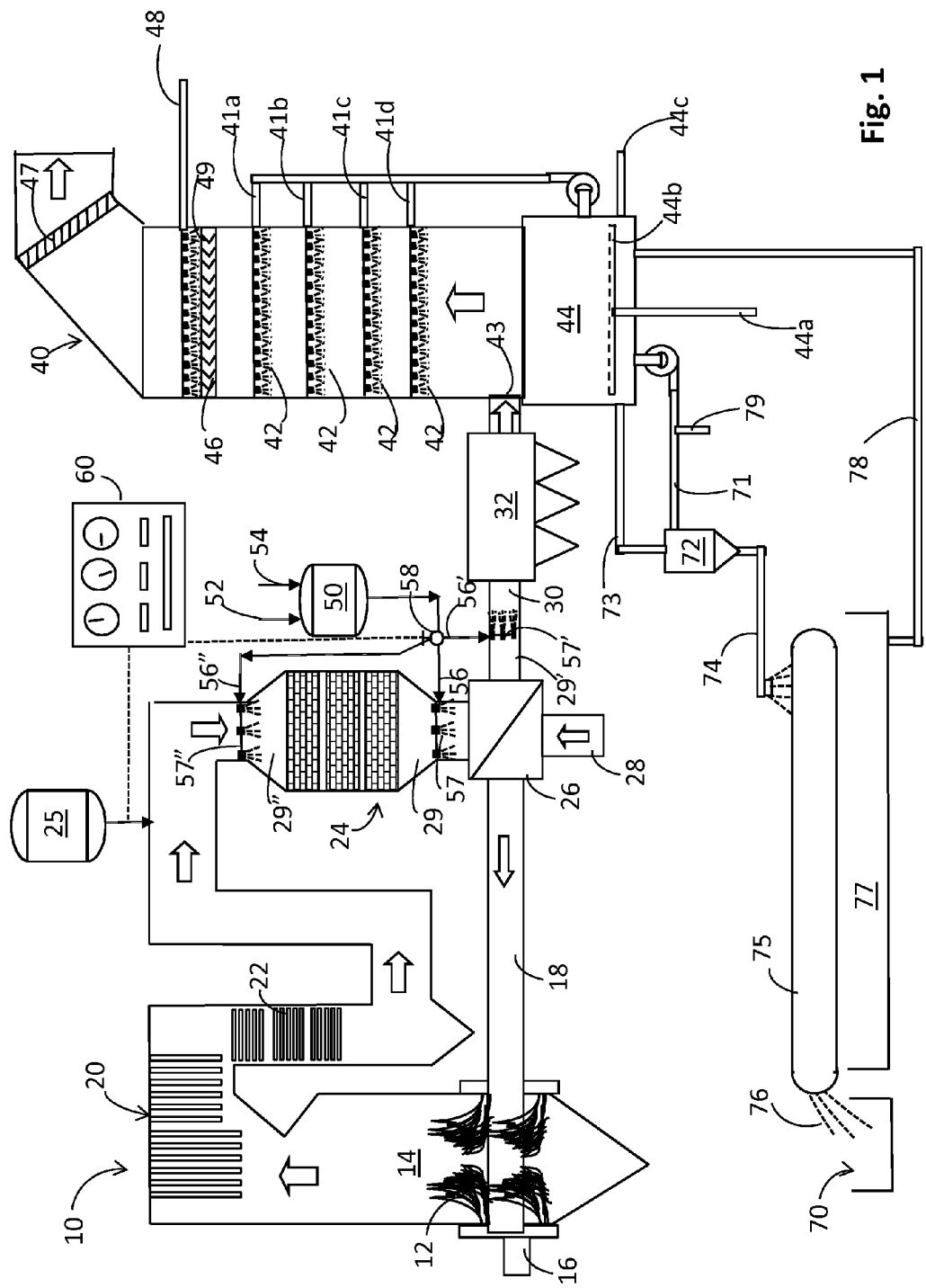
FIG. 1 is a flow diagram of one embodiment of the invention involving a single-loop, open-tower countercurrent limestone wet scrubber.

Reference is first made to FIG. 1, which is a flow diagram of one embodiment of the invention involving a single-loop, open-tower countercurrent limestone wet scrubber, which is employed to reduce the $SO_2$ content of the gases resulting from combustion. The illustrated combustion installation includes a combustor 10 having burners in a combustion zone 12 that provide thermal heat in combustion zone 14 by burning fuel from a source 16 with air supplied by duct work 18.

Any conventional fuel from fossil fuels (e.g., oil, coal and/or gas) to biomass (e.g., vegetative waste or dedicated growth) and refuse (e.g., domestic and industrial wastes having suitable BTU values) can be employed alone or as a blend. It is an advantage of the invention that coal that is high in chloride and sulfur can be combusted with the resulting pollutants, such as HCl emissions, selectively reduced relative to $SO_x$. It will be understood that the principals of the invention can be applied to other carbonaceous fuels and fuel mixtures (any other fuel of choice, typically a carbonaceous thermal fuel or refuse). Biomass is interesting, especially as a blending component, because it is considered environmentally friendly; however, it can have significant chloride contents. For the context of this discussion, biomass is used to describe waste products and dedicated energy crops. Waste products include wood waste material (e.g., saw dust, wood chips, etc.), crop residues (e.g., corn husks, wheat chaff, etc.), and municipal, animal and industrial wastes (e.g., sewage sludge, manure, etc.). Dedicated energy crops, including short-rotation woody crops like hard wood trees and herbaceous crops like switch grass, are agricultural crops that are solely grown for use as biomass fuels. These crops have very fast growth rates and can therefore be used as a regular supply of fuel. It is an advantage of the invention that biomass and refuse having relatively high chlorine contents, e.g., above 0.1 percent, can be effectively blended with higher sulfur coals to take advantage of their low sulfur content to offset the sulfur in the coal without detrimentally affecting the operation of a wet scrubber.

Limestone is the preferred form of calcium carbonate but can be replaced with another form, if desired. In addition to limestone, other forms of calcium carbonate include oyster shells, aragonite, calcite, chalk, marble, marl, and travertine. It can be mined or manufactured. In this description, the terms calcium carbonate and limestone are used interchangeably.

Hot combustion gases flow through the upper portion of combustor 10 as indicated by the block arrows, then flow past heat exchangers shown in various sections, from 20 to 22, which transfer heat from the combustion gases to water or steam for the generation of steam or super-heated steam. Other configurations may also be employed as dictated by the design of a particular boiler. Air for combustion, supplied by line 28, is typically preheated as noted by gas-to-gas heat exchanger 26 which transfers heat from ductwork at the exit end of the combustion equipment, e.g., downstream of heat exchange sections 20 and 22, where useful thermal energy is recovered from the combustor.

Following heat exchangers 20 and 22 the combustion gases may be passed into a selective catalytic reduction (SCR) reactor 24 wherein $NO_x$ created during combustion can be treated with ammonia or gasified urea (including ammonia and HNCO), which can be supplied from storage tank 25 or the like, to convert the $NO_x$ to nitrogen and water. Alternatively, many installations will benefit from selective non catalytic reduction (SNCR) using urea alone at higher temperatures, e.g., as taught by Epperly, et al., in U.S. Pat. No. 5,057,293, without requiring the reactor 24.

Following SCR reactor 24, the combustion gases will flow through an air-to-air heat exchanger 26. The combustion gases leaving the heat exchanger 26 are cooled significantly by the time they are passed through duct work 30 to a particulate recovery device 32, which can be electrostatic precipitator (ESP), baghouse or other like suitable device. Particulate recovery device 32 collects particulates prior to passing the gases through a wet scrubber 40 for discharge to a stack, not shown. The scrubber 40 is illustrated in FIG. 1 as a single-loop, open-tower countercurrent limestone wet scrubber. This is a highly-generalized version of actual industrial or utility combustor configurations and effluent treatment processes, but illustrates a workable scheme. The temperature of the gases leading to the SCR reactor will be at a temperature suitable for the SCR reaction, e.g., a temperature within the range of from about 500° to about 1000° F. And, the temperature following the SCR and prior to the particulate recovery device 32, e.g., in lines 29 to 30, will typically be within the range of from about 250° F. to about 1000° F. Of course, not all embodiments will include a SCR unit, and these embodiments will generally encounter the same temperatures upstream of the particulate recovery device 32.

The invention improves the operation of scrubbers like this by capturing gaseous chlorides from the combustion gases and converting them into an insoluble solid form, which is enabled by introducing a copper bearing chloride remediator (CBCR) composition in aqueous form into contact with combustion gases to react with the HCl in the gases to convert it to a solid, recoverable form; passing the gases to a particulate recovery device 32 to collect solids including chloride; and feeding a resulting reduced chloride concentration gas stream to a wet scrubber 40, thereby enabling the scrubber to operate more efficiently.

It has been discovered that a group of highly-active copper compositions are effective for remediating HCl in the combustion gases prior to feeding them to a wet scrubber and can be employed as water-borne chemicals for introduction into a flue gas to be treated. The copper compositions effective for HCl control are referred to as a group according to the invention as copper-bearing chloride remediators (CBCRs). Significantly, these compositions are not sorbents that collect pollutants and survive passage though the combustor for collection downstream. The CBCRs identified by the invention do not survive but are chemically altered and are believed to react with the HCl and other chlorides. As used in this description, the term "composition" includes compounds and complexes and is not meant to differentiate between types of bonding, e.g., "strong bonds" such as covalent or ionic bonds and "weak bonds" such as dipole-dipole interactions, the London dispersion force and hydrogen bonding. It is believed that some of the CBCRs are chemical complexes.

In embodiments the CBCR is introduced in aqueous form, supplied, e.g., from tank 50, within a defined introduction zone under defined conditions before the gases are cooled to below about 250° F. In embodiments, the introduction zone is designed to provide sufficient reaction time to react with the HCl in the gases in duct 29 and/or 30 to react with it and convert it to recoverable solid form. The gases are then passed to the particulate recovery device 32 to provide a reduced chloride gas stream. This reduced chloride gas stream is fed to a wet scrubber 40 in normal fashion but enables the scrubber to operate more efficiently because chlorides do not build up as fast as without the invention.

The CBCR will be introduced to reduce HCl and the process will entail steps of monitoring the HCl concentration of the combustion gases prior to the defined zone (e.g., duct segments 29, 29' and 29") and following the defined zone, wherein the temperature is less than 1000° F., preferably within the range of from about 250° to about 900° F. In this regard, introduction of the CBCR into duct segment 29", just ahead of the SCR unit, can be advantageous in units employing them because the gases at this point are consistently at a temperature suitable for SCR reactors and the duct segment 29" will typically have an enlarged section where the velocity of the gas is reduced prior to entry into the SCR reactor 24.

In one aspect, the CBCR will comprise at least one water-soluble or water-dispersible copper composition which is believed to form copper oxides when heated in situ by the flue gases being treated. Specifically referenced compositions are those described in U.S. Pat. No. 4,020,180 as comprising an aqueous cupramine lower carboxylate complex of copper lower carboxylate and amine-containing lower carboxylate. Desirably in accord with U.S. Pat. No. 4,020,180, the complex can contain weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4 In U.S. Pat. No. 4,020,180, the claimed composition is interchangeably referred to as "cuprammonia acetate complex" and "cuprammonium lower carboxylate complex." At the time the patent states that the structure of the product was not determined, but was believed that the reaction product had a formula of $Cu(NH_3)_2(O-CO.CH_3)_2$. It appears that the inventors of U.S. Pat. No. 4,020,180 did not know whether the nitrogen-containing groups bonded to copper are ammonia ($NH_3$) or ammonium ($NH_4^+$). Our structural investigation of the composition claimed in U.S. Pat. No. 4,020,180 indicates that the nitrogen-containing groups that are bonded to copper are ammonia ($NH_3$) groups; however, for consistency with the patent, we use the same nomenclature used in U.S. Pat. No. 4,020,180 and refer to the compound as "cuprammonium lower carboxylate."

In embodiments, CBCRs according to the invention are highly soluble or dispersible in water and react with the hot combustion gases to result in compositions chemically different from when contacted with the combustion gases. Desirably, CBCRs include copper compositions that have copper that can be released in an active form at the temperatures involved to form a reactive copper entity. Introduction of the CBCR into elevated temperatures results in decomposition to the reactive copper entity. The CBCR decomposes to elemental copper, $Cu_2O$, and $CuO$.

Among the CBCRs of interest to the invention are compositions that comprise copper and an ammonia moiety. Among these are amine-containing copper compositions, including those having one or more copper atoms with one or more nitrogen-containing moieties. Water solubility or dispersibility is important because introducing them with water has been shown to be a highly-effective manner of achieving the necessary distribution followed by dissociation. Chemical dispersants and agitation can be employed as necessary.

In embodiments of the invention, the CBCRs will comprise a copper composition selected from the group consisting of copper carbonate, copper acetate, copper ammine acetate, copper diamine diacetate, copper amine triacetate, copper triamine acetate, copper tetraamine sulfate, copper gluconate (and hydrates thereof), and mixtures of any of these. From another perspective, the copper-bearing chloride remediator can be a member selected from the group consisting of compositions defined by the formula $Cu(NH_3)_x$(lower carboxylate)$_y$, wherein the lower carboxylate is selected from the group consisting of formate, acetate and propionate, x is an integer from 0 to 4, y is an integer from 0 to 2, and x+y is equal to or greater than 1.

Closely related compositions and their hydrates as well other copper sources that exhibit similar efficacies in reacting with HCl can be employed. Copper compositions that contain no nitrogen-containing moiety, can be employed. If desired, these compositions can optionally be supplemented with a compound related to ammonia, such as a result of processing (e.g., for $NO_x$ reduction) or by supplementation as desired with ammonia or urea or other material effective to produce ammonia at the temperatures involved, as well as compounds equivalent in effect, e.g., amines and their salts, urea breakdown products, amine salts of organic and inorganic acids, ammonium carbamate, biuret, ammelide, ammeline, ammonium cyanate, ammonium carbonate, ammonium bicarbonate; triuret, cyanuric acid; isocyanic acid; urea formaldehyde; melamine; tricyanourea and mixtures and equivalents of any number of these.

Among CBCRs not containing an nitrogen-containing moiety are copper carbonate, copper carbonate basic, copper acetylacetonate (and hydrates thereof), copper citrate (and hydrates thereof, e.g., hemipentahydrate), copper formate (and hydrates thereof), copper acetate (and hydrates thereof), copper nitrate (and hydrates thereof), copper 2,4-pentandionate (and hydrates thereof), copper sulfate (and hydrates thereof), copper gluconate (and hydrates thereof), copper soaps of fatty acids, other saponifications, chelated copper compounds and mixtures of any of these.

Reference is again made to FIG. 1, which depicts a mixing stage 50 provided to prepare an aqueous treatment agent containing water supplied via line 52 and one or more CBCRs supplied via line 54. The vessel 50 can be agitated as necessary. The relative amounts of the materials and water can be controlled by a suitable controller 60, or batching and feed of the CBCRs can be achieved manually. Dotted lines in the drawings schematically designate control lines for proper communication between the various controlled lines and valves and the controller 60.

The CBCR will typically be supplied in aqueous form, containing from 60 to 99.8% water, with a narrower range being from about 70 to about 95%. These and other percentages given in this application are based on weight. The CBCR can be introduced via line 56, 56' and/or 56" to nozzle arrays 57, 57' and/or 57", respectively, depending on measured temperatures to introduce it into the defined zone, wherein the temperature is less than 1000° F., preferably within the range of from about 250° to about 900° F., which can be controlled by controller 60 and suitable valving, e.g., 58. A narrower temperature range of from 350° to 800° F. can be employed in embodiments.

In some embodiments, conditions will call for introducing the CBCRs using modeling techniques, such as computational fluid dynamics, which can be employed to initially determine the optimum locations (zones) to direct treatment chemicals within the boiler and/or ducts. Desirably, best CBCR introduction will achieve essentially full coverage of the CBCRs across a three-dimensional section of a passage for the gases to be treated. Preferably, a number of nozzles will be spaced within the zones to achieve at least 90% coverage at the temperature necessary for reaction. This section can have a depth in the direction of flow as necessary to assure complete coverage from the sorbent injectors used. In other words, the zone will preferably be of a depth in the direction of flow sufficient that each of the conical or like spray patterns from nozzles used to introduce the CBCR will overlap with at least one other spray pattern, thereby providing CBCR across the entire cross section of the zone. This three-dimensional section for treatment can be referred to as a defined introduction zone, and the aqueous CBCR will be introduced into this zone under conditions effective for HCl and/or $SO_x$ emissions control. Following this zone (i.e., downstream of it) the combustion gases now having been treated with the CBCR are discharged following sufficient reaction time to reduce the HCl and/or $SO_x$ concentration in the gases.

A monitor for HCl will be positioned before and/or after the introduction zone to determine the effectiveness of the treatment. Monitors following the zone are positioned far enough downstream of the zone to assure time for essentially complete reaction between the pollutant and the CBCR. Residence times of at least one second and preferably from 2 to 5 seconds will usually be effective.

Desirably, the invention will achieve full effect by modeling, e.g., by mechanical modeling or computational fluid dynamics using computer and data input means to identify locations within a combustor for feeding aqueous CBCR and determine the physical form and injection parameters such as pressure, droplet size, droplet momentum and spray pattern for injection means positioned at locations, e.g., via line 56, 56' and/or 56" to nozzle arrays 57, 57' and/or 57", respectively, depending on measured temperatures in the defined zone with introduction controlled by controller 60 and suitable valving, e.g., 58.

Each of the injector locations will typically employ a plurality of nozzles, e.g., in arrays 57 and/or 57', strategically positioned across the cross section at the designated locations to achieve essentially full cross sectional coverage. Note that FIG. 1 shows addition of aqueous CBCR into a suitable portion of the ductwork, e.g., before or after air preheater 26, before or after particulate reducing apparatus 32, where the temperature will be suitable.

The treatment rates of the aqueous CBCR will provide an effective amount of aqueous CBCR to reduce chloride concentrations entering the scrubber by greater than 50%. This can be different from assuring that the HCl content is maintained below about 0.002 pounds per MMBtu (approximately 2 $ppm_v$), which is typically accomplished by the scrubber. The advantage the invention offers in this context is the great reduction in chlorides to the scrubber with the attendant advantages discussed. Feed rates will generally be less than 10 pounds per ton of fuel, e.g., from about 1 to 8 pounds per ton, and often from greater than about 1 to about 6 pounds per ton of fuel.

The locations for the nozzles can be determined by computational fluid dynamics, by methodologies taught for example in U.S. Pat. No. 5,740,745 and U.S. Pat. No. 5,894,806, which are hereby incorporated by reference. The concentration of the CBCR and water in the treatment fluid, the nozzle pressure, droplet size, droplet momentum, spray pattern and flow rates can be initially determined by modeling to assure that the proper amount of CBCR is supplied to the correct location in the combustor or downstream equipment in the correct physical form to achieve the desired results of reduced HCl and/or $SO_2$.

Referring again to FIG. 1 and the detail of the single-loop, open-tower countercurrent limestone wet scrubber 40 is shown to include four spray headers 41a, 41b, 41c and 41d, each with a plurality of nozzles 42. Combustion gases from the particulate recovery apparatus 32 are introduced into the scrubber 40 near the bottom through inlet 43, just above reaction tank 44, which is typically stirred by suitable means (not shown). The combustion gases move upward through the scrubber and come into gas-to-liquid contact with scrubbing fluid introduced via nozzles 42 toward exit 45. Prior to exiting the scrubber, the gases are freed of entrained liquid by means of one or more mist eliminators, e.g., shown here as 46 and 47, which are typically washed by incoming makeup water via line 48 and associated nozzles 49. The water from line 48 will be added to make up the water lost to evaporation and as accompanies product recovered in solids collector 70. Means for supplying oxygen to the reaction tank are provided to oxidize $CaSO_3$ to $CaSO_4$. In the drawings, air from line 44a and sparger 44b facilitates supplying oxygen for the oxidation of sulfite and bisulfite ions to sulfate ions. The tank 44 is preferably stirred by conventional means which are not illustrated in the Figure. Fresh limestone can be added via line 44c.

In operation, sulfur oxides in the combustion gases are absorbed into the aqueous phase of the slurry, forming bisulfite and hydrogen ions. Some bisulfite oxidizes to sulfate, releasing even more hydrogen ions. As the droplets fall through the combustion gases flowing upwards though the scrubber and countercurrent to them, they become saturated with hydrogen ions, and the calcium carbonate (limestone) begins to dissolve at an increasing rate, thus forming calcium ions and bicarbonate. The calcium carbonate is supplied in finely-pulverized form, which is effective at reacting with the hydrogen ions absorbed in the slurry. It is desirable to maintain high gas velocities and spray patterns that tend to maintain the slurry droplets suspended with a degree of fluidization to achieve enhanced contact. By enabling better control of chloride in the slurry, the invention promotes the maintenance of high gas velocities and thus droplet entrainment.

On the other side of the process as illustrated in FIG. 1, slurry is withdrawn from reaction tank 44 via line 71 for concentrating the reactive calcium carbonate for recycle and reducing the level of solids, principally by removing gypsum. FIG. 1 shows slurry being withdrawn from reaction tank 44 via line 71 and passed to hydrocyclone 72. The hydrocyclone can separate fine particles of limestone from typically larger particles of calcium sulfate. The separation of the smaller particles of limestone provides a recycle stream 73 rich in calcium carbonate and a discharge stream 74 rich in calcium sulfate. FIG. 1 shows the recycle stream being concentrated in terms of calcium carbonate and useful process water in hydrocyclone 72. Stream 74 can be fed to filter or like device 75 for separating solids product 76, which fall into hopper 70, from a liquid filtrate, which is collected by means 77 for recycle to reaction tank 44.

It is generally necessary to remove both excess inert matter which is introduced with the finely pulverized limestone or as fly ash and other solids in the untreated flue gas and to control dissolved chlorides. Because the level of chlorides present in the system of the invention, it is possible to control the process instead of monitoring the chloride content of the slurry in recycle line 71, to control it by the inert solids in this or another line. Blowdown can be achieved, for example, by controlled bleed from line 79.

Figure 2:
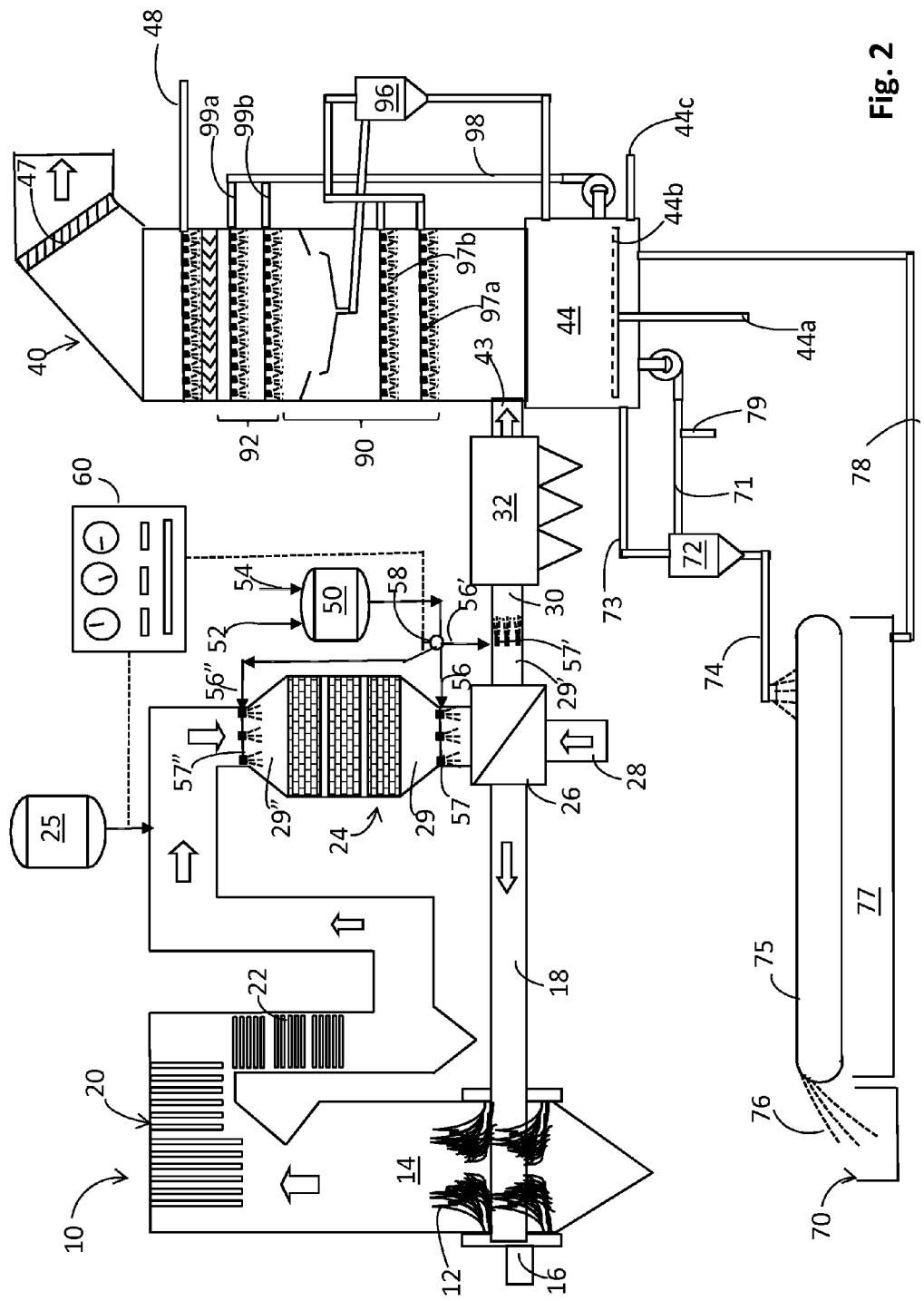
FIG. 2 is a flow diagram of another embodiment of the invention involving a double-loop, open-tower countercurrent wet scrubber.

FIG. 2 is a flow diagram similar to FIG. 1, but shows another embodiment of the invention involving a double-loop, open-tower countercurrent wet scrubber. In FIG. 2, the double loop arrangement provides separated prescrubber or quencher section (shown bracketed by parentheses and identified as 90) at the inlet 43 from the scrubber slurry loop (shown above it bracketed by parentheses and identified as 92). The separation of the tower into two zones in this manner is thought to enhance limestone utilization by promoting low pH in the prescrubber/quencher loop. The quencher section 90, being upstream of the scrubbing section tends to humidify and cool incoming flue gases prior to the scrubbing section. The two-loop process is intended to confine chloride ions to the prescrubber/quencher loop and typically requires special materials of construction. The separation of the loops is also intended to permit operation of the scrubber loop 92 in a gypsum-subsaturated mode to enhance oxidation in the prescrubber/quencher loop 90 and permit production of a gypsum byproduct. The prescrubber/quencher loop 90 is shown to include slurry collection device 94, which collects slurry exiting the scrubber slurry loop 92 and directs it to hydrocyclone 96 for separation into a low solids fraction sent to headers 97a and 97b, and a high solids fraction sent to reaction tank 44. The scrubber loop 92 will feed headers 99a and 99b via line 98 from the reaction tank 44.

Figure 3:
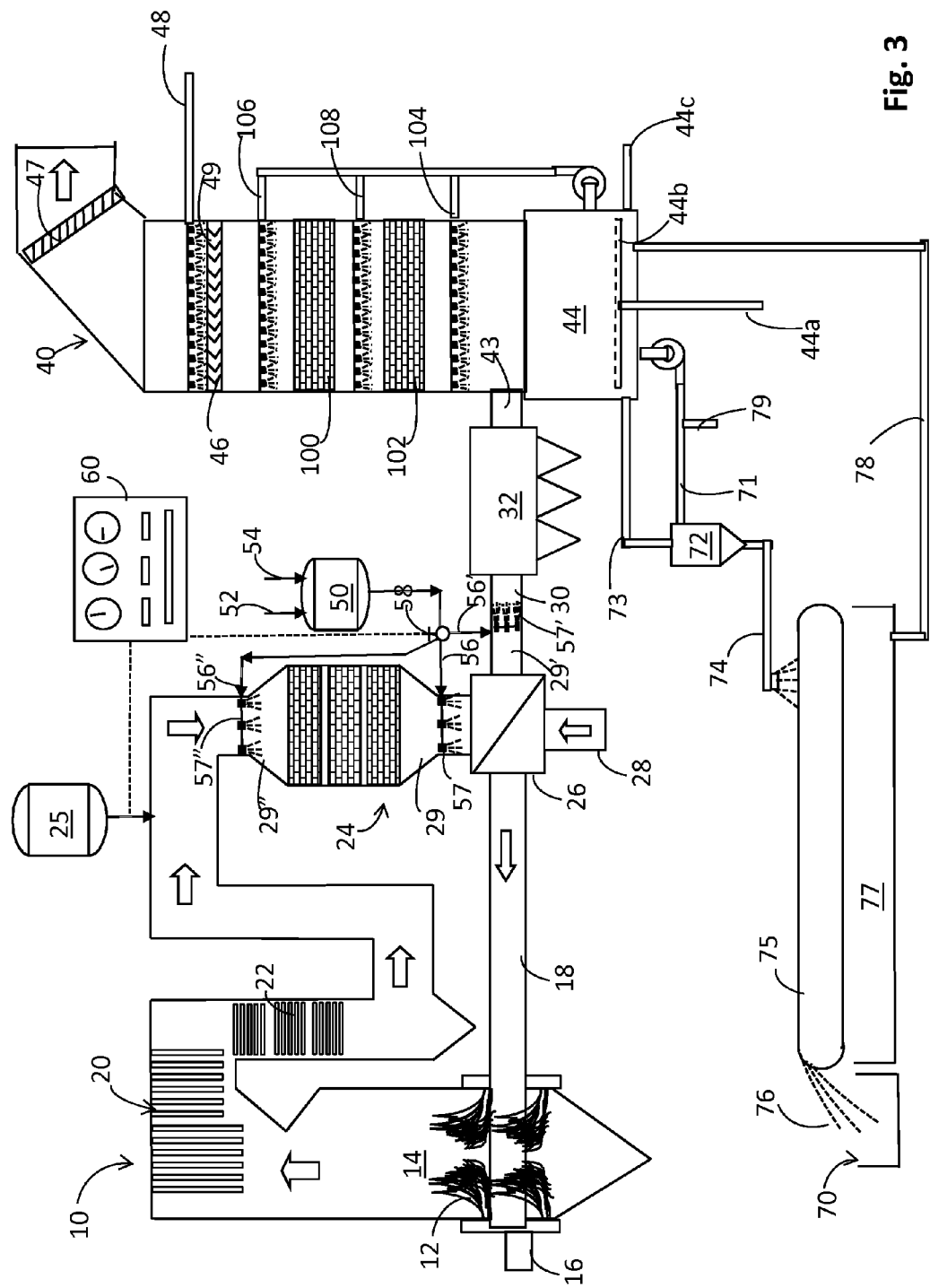
FIG. 3 is a flow diagram of another embodiment of the invention involving packed-bed wet scrubber.

FIG. 3 is a flow diagram similar to FIG. 1, but shows another embodiment of the invention involving packed-bed wet scrubber. In this embodiment, packed beds 100 and 102 are provided to enhance gas-liquid contact. FIG. 3 shows a single open-tower, type spray header 104 in addition to the spray headers 106 and 108 positioned in advance of packed beds 100 and 102, which can be of any suitable design, e.g., static bed, mobile bed, and rod deck, as those are described, for example, by D. S. Henzel, B. A. Laseke, E. O. Smith, and D. O. Swenson, Project Summary Limestone FGD Scrubbers: User's Handbook; 1981; EPA-600/S-81-017. This entire publication is hereby incorporated by reference with regard to wet scrubbers, all of which can be improved by the operation of the invention. See also, See, for example, Srivastava, Ravi K.; Controlling $SO_2$ Emissions: A Review of Technologies; EPA/600/R-00/093, November 2000; which is also incorporated herein by reference for its descriptions of wet scrubbers.

In addition to these scrubber arrangements and usual commercial units that can contain one or more of the described features in various arrangements, the advantages of the invention will extend also to other scrubbers where chlorides can cause operation compromises. For example, horizontally-oriented horizontal gas flow, vertical limestone slurry flow wet scrubber, such as illustrated in U.S. Patent Publication No. 2010/0320294, and the like, can be improved by the invention.

It is another advantage of the invention that the CBCR treatment compositions of the present invention do not alter the effectiveness of brominated powdered activated carbon used for mercury remediation. This is believed to be made possible by the breakdown of the CBCR compositions during treatment in such a way that the HCl is taken out of the combustion gases and converted to a solid, such as copper chloride, which can be removed with the particulates.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A process for reducing the chloride content in a gas stream for reducing the amount of chlorides fed to a wet scrubber, comprising:
   a. introducing a copper bearing chloride remediator composition in aqueous form into contact with combustion gases within a defined introduction zone under conditions effective for HCl emissions control;
   b. passing the gases from the introduction zone to a particulate recovery device to provide a reduced chloride gas stream; and
   c. feeding the reduced chloride gas stream to a wet scrubber to enable the scrubber to operate more efficiently.

2. A process according to claim 1, wherein the copper bearing chloride remediator composition comprises a copper composition selected from the group consisting of the copper diamine diacetate, copper amine triacetate, copper triamine monoacetate, copper carbonate, copper carbonate basic, copper acetate and hydrates thereof, copper acetylacetonate and hydrates thereof, copper citrate and hydrates thereof, copper formate and hydrates thereof, copper nitrate and hydrates thereof, copper pentandionate and hydrates thereof, copper sulfate and hydrates thereof, copper gluconate and hydrates thereof, copper soaps of fatty acids, and mixtures of any of these.

3. A process according to claim 1, wherein the copper bearing chloride remediator composition is introduced to reduce HCl and the process further includes the steps of: monitoring the HCl concentration of the combustion gases prior to the defined introduction zone; monitoring the HCl concentration following the defined introduction zone, wherein the temperature is less than 1000° F.; sending control signals representative of each monitored concentration; comparing the control signals to reference values; and, based on the comparison, adjusting the introduction of the copper bearing chloride remediator.

4. A process according to claim 1, wherein the copper bearing chloride remediator composition is introduced to reduce $SO_2$ and the process further includes the steps of: monitoring the $SO_2$ concentration of the combustion gases prior to the defined introduction zone; monitoring the $SO_2$ concentration following the defined introduction zone, wherein the temperature is less than 1000° F.; sending control signals representative of each monitored concentration; comparing the control signals to reference values; and, based on the comparison, adjusting the introduction of the CBCR.

5. A process according to claim 1, wherein the copper-bearing chloride remediator is introduced at a temperature within the range of from about 250° to about 900° F. to reduce HCl.

6. A process according to claim 1, which further comprises: identifying locations within a combustor for feeding the copper bearing chloride remediator composition; determining the physical form and injection parameters for the copper bearing chloride remediator composition; injecting the copper bearing chloride remediator composition under conditions effective to provide complete coverage across a cross section of the introduction zone.

7. A process according to claim 1, wherein the scrubber is a single-loop countercurrent limestone wet scrubber.

8. A process according to claim 1, wherein the scrubber is a double-loop countercurrent limestone wet scrubber.

9. A process according to claim 1, wherein the scrubber is a packed-bed countercurrent limestone wet scrubber.

10. A process according to claim 1, wherein the scrubber is a horizontal gas flow, vertical limestone slurry flow wet scrubber.

11. An apparatus for reducing hydrogen chloride in a gas stream, comprising:
   a. injection means positioned at locations on a passage for flue gases generated by the combustion of fuel, said injection means capable of feeding a copper bearing chloride remediator composition at a predetermined rate relative to a concentration of chloride in said flue gases; and
   b. particulate collection means to collect solids from the flue gases following contact with the copper bearing chloride remediator; and
   c. a scrubber for removing sulfur oxides from the flue gases comprising
      i. an inlet for the flue gases from the particulate collection means;
      ii. an outlet for flue gases from the tower;
      iii. a side wall defining a scrubbing section to direct gases between the inlet and the outlet;
      iv. a plurality of spray nozzles positioned within the side wall between the inlet and the outlet and operably positioned to spray a limestone slurry into contact with said flue gases in said tower; and
      v. a reaction tank to collect slurry exiting the scrubbing section.

12. An apparatus according to claim 11, which further comprises:
   a quencher section upstream of the scrubbing section to humidify and cool incoming flue gases prior to the scrubbing section.

13. An apparatus according to claim 11, which further comprises:
   at least one packed bed in the scrubbing section.

14. An apparatus according to claim 11, which further comprises:
   means for supplying oxygen to the reaction tank to oxidize $CaSO_3$ to $CaSO_4$.

15. A system including the apparatus according to claim 11, which further comprises:
   a. computer modeling means for identifying locations within a combustor and its duct work for feeding a copper bearing chloride remediator composition and determining the physical form and injection parameters for the composition; and
   b. controller means for achieving the physical form and injection parameters as determined by said computer modeling means.

\* \* \* \* \*